Figure 1:
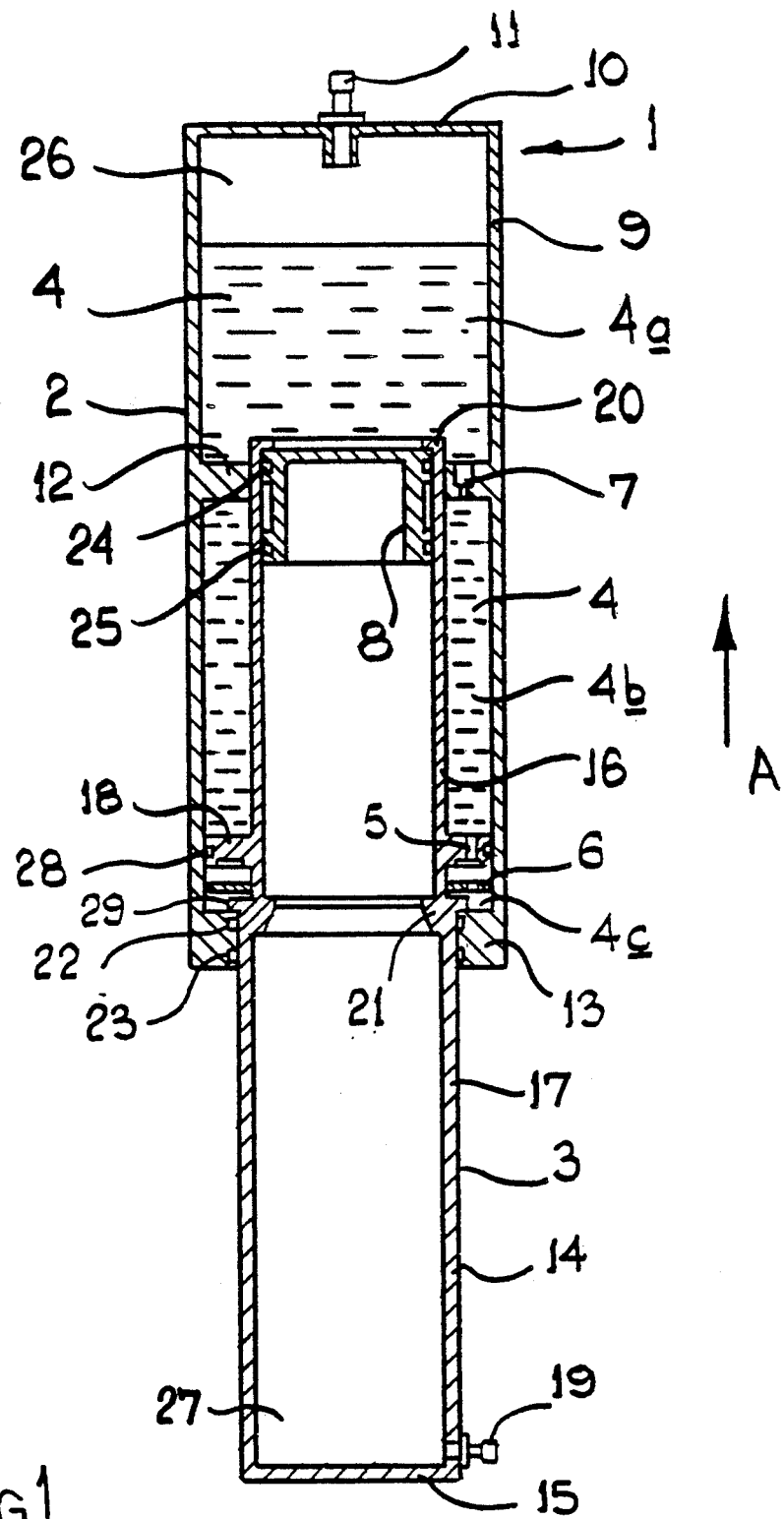

United States Patent [19]

Hatton

[11] Patent Number: 4,995,597
[45] Date of Patent: Feb. 26, 1991

[54] HYDRAULIC SHOCK ABSORBER WITH TELESCOPIC CASINGS

[75] Inventor: John J. Hatton, Highnam, United Kingdom

[73] Assignee: Dowty Rotol Limited, Gloucester, England

[21] Appl. No.: 347,383

[22] Filed: May 2, 1989

[30] Foreign Application Priority Data

May 4, 1988 [GB] United Kingdom ............... 8810538

[51] Int. Cl.⁵ .......................... F16F 9/14; F16F 5/00; F16F 9/06
[52] U.S. Cl. ............................. 267/64.15; 188/269; 267/64.26
[58] Field of Search .................. 267/113, 64.26, 64.13, 267/64.15; 280/708; 92/174, 169.4, 171.1; 188/269

[56] References Cited

U.S. PATENT DOCUMENTS 2,618,478 11/1952 Conway ........................ 267/64.26 X

FOREIGN PATENT DOCUMENTS 2511289 9/1975 Fed. Rep. of Germany ... 267/64.26
0034074 3/1951 Poland .............................. 267/64.26
0585261 2/1947 United Kingdom ............ 267/64.26

Primary Examiner—Robert J. Oberleitner
Attorney, Agent, or Firm—Young & Thompson

[57] ABSTRACT

A hydraulic shock absorber suitable for use with an aircraft landing gear which includes: a first casing member telescopically and sealingly engaged with a second casing member, the second casing member having a first section of reduced diameter in comparison to a second section; and an oil reservoir defined by the first and second casing members, which is divided into two distinct volumes by a one way restrictor attached to the second casing member. The volume of the oil reservoir defined by the first casing member and the first section of the second casing member is further divided into two sections by a two-way restrictor.

6 Claims, 2 Drawing Sheets

HYDRAULIC SHOCK ABSORBER WITH TELESCOPIC CASINGS

This invention relates to a hydraulic shock absorber, and, is particularly, related to hydraulic shock absorbers for use with aircraft and which utilises a gas spring effect.

For many years, shock absorbers which have been used in conjunction with aircraft landing gear suspension arrangements have utilised a gas spring effect in their operational characteristics.

However, one of the major problems, appreciated for a number of years in the industry, with known shock absorber arrangements results from cavitation. Cavitation occurs during compression of the shock absorber in the vicinity of the restrictor means incorporated in the arrangement. The cavitation causes a build-up of gas in, and in the vicinity of, the restrictor means which drastically affects the operational characteristics of the shock absorber, particularly in the initial stages of recoil of the shock absorber.

Ultimately, the build up in gas results in the shock absorber operating below its maximum operating efficiency. This is particularly true when the shock absorber is subjected to a rapid oscillatory cycle, for example during taxiing of an aircraft on a bumpy airfield.

The present invention is concerned with eliminating, or at the very least drastically reducing, the cavitation problems and the effects that cavitation causes on the operation of the shock absorber.

In accordance with the present invention a hydraulic shock absorber includes:

a first casing member telescopically and sealingly engaged with a second casing member, said second casing member having a first section of reduced diameter in comparison to a second section; and an oil reservoir defined by the first and second casing members, which is divided into two distinct volumes by a one way restrictor means attached to the second casing member;

wherein the one way restrictor means acts to restrict the flow of oil from the volume of the oil reservoir defined by the first casing member and the second section of the second casing member to the volume of the reservoir defined by the first casing member and the first section of the second casing member only and the volume of the oil reservoir defined by the first casing member and the first section of the second casing member is further divided into two sections by a two way restrictor means.

With this type of hydraulic shock absorber the oil reservoir has a first volume of the oil reservoir which is defined by the first casing member and the first section of the second casing member, and a second volume of the oil reservoir which is defined by the first casing member and the second section of the second casing member.

When the hydraulic shock absorber is fully extended the volume of the oil in the second volume of the oil reservoir is at a base level, which may be effectively substantially zero. Now as a compressive force is applied to the shock absorber, the first and second casing members move relative to one another so as to cause oil to flow from the first volume to the second volume of the oil reservoir.

The difference in the diameter of the respective sections of the second casing member, which with the first casing member defines the respective volume of the oil reservoir, between the first and second volumes of the oil reservoir means that during compression of the shock absorber no cavitation is caused, as a result of net positive pressurisation of the shock absorber. Primarily, this is due to the difference in diameters, and the resultant volume of the oil reservoir in total between the extended and compressed states.

Further, the site of the one way restrictor with regard to the two way restrictor is a further contributory factor which has to be taken into consideration.

Preferably, the hydraulic shock absorber is provided with a gaseous volume in the volume of the oil reservoir which is defined by the first casing member and the first section of the second casing member. In this way a gas spring effect is built into the hydraulic shock absorber.

Preferably, the hydraulic shock absorber further includes a slidable piston mounted within the second casing member, and separating the oil reservoir from a gaseous capacity.

This provides the hydraulic shock absorber with a further gas spring effect means. Now when both the gaseous volume and capacity are included in an hydraulic shock absorber made in accordance with the present invention, the hydraulic shock absorber has a two stage gas spring effect.

The general operating characteristics of a hydraulic shock absorber made in accordance with the above defined invention are shown in the Force vs. Compression diagram shown in FIG. 2b of the drawings.

Preferably, the or each, gaseous volume consists of a volume of substantially inert gas such as nitrogen.

This invention also includes an aircraft landing gear incorporating a hydraulic shock absorber made in accordance with the present invention.

Figure 2:
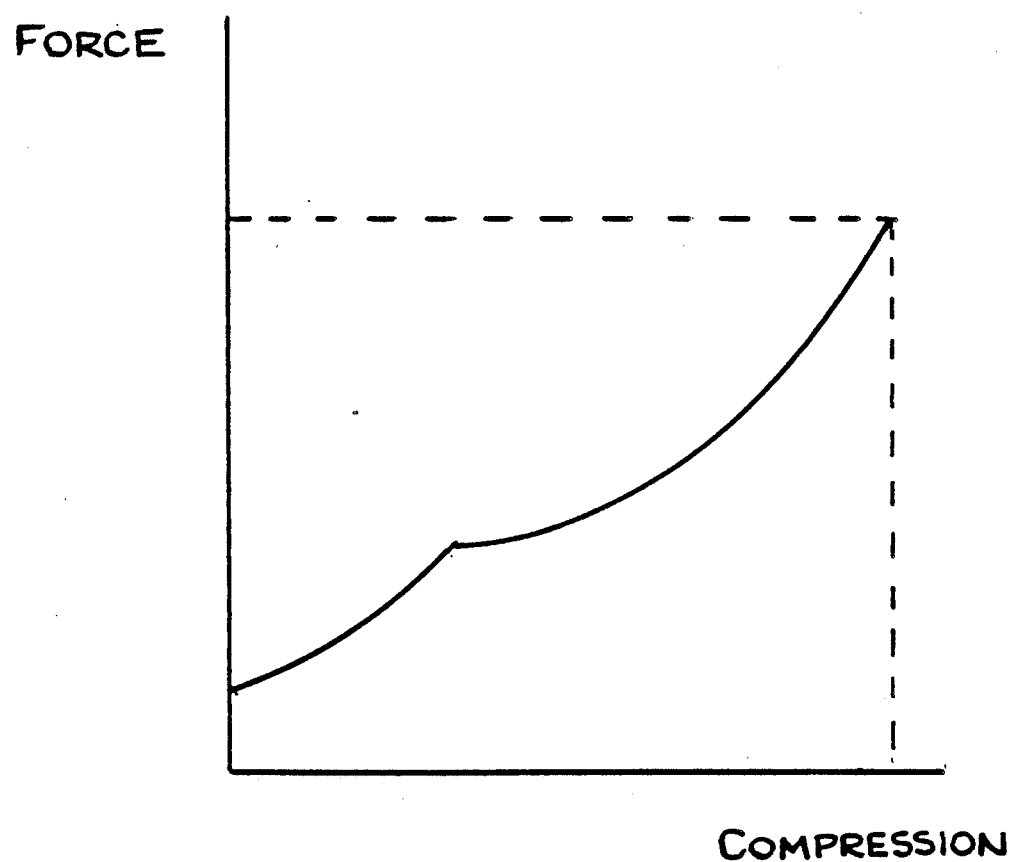

The invention will now be described by way of example, by description of a preferred example, illustrated in the accompanying drawings, in which:

FIG. 1 shows a schematic representation of a shock absorber in accordance with the present invention; and FIG. 2 shows a Force vs. Compression diagram for the shock absorber of present inventions.

Referring to FIG. 1 of the drawings, an hydraulic shock absorber 1 includes:

an outer casing member 2;
an inner casing member 3;
and oil reservoir 4;
a one-way restrictor 5, having a plate valve 6;
a two way restrictor 7; and
a slidable piston 8 mounted in the inner casing member 3.

The outer casing member 2 comprises a cylindrical side wall 9 and an end wall 10, and is provided with:
an inflation valve 11;
an internal circumferentially extending bearing 12; and
an inwardly directed lip 13.

The inner casing member 3 comprises a stepped cylinder side wall 14 and an end wall 15.

The inner casing member 3 is provided with an upper section 16 and a lower section 17.

The upper section 16 is of reduced diameter in relation to the lower section.

Further, the inner casing member 3 is provided with:
a circumferentially extending shoulder 18 positioned in the vicinity of the change in diameter between the upper section 16 and the lower section 17;
an inflation valve 19;

an inwardly turned lip 20; and
an internally directed abutment member 21.

The inner casing member 3 is telescopically mounted within the outer casing member 2, so that the lower section 17 thereof projects from the outer casing member 2, and the shoulder 18 is allowed to travel between the shelf 12 and the lip 13. The two casing members are mounted so that the lower section 17 of the inner casing member is slidably engageable with the lip 13 of the outer casing member, and the upper section 16 of the inner casing member 3 is slidably engageable with the bearing 12 of the outer casing member 2. The two end walls of the respective casing members are at opposing ends of the shock absorber.

In order to enhance the sealing contact between the casing members, the lip 13 of the outer casing member 2 is provided with two sealing members 22, 23 which engage with the inner casing member 3. The one way restrictor 5 and plate valve 6 are mounted o the shoulder 18 of the inner casing member 3, which is also provided with a sealing member 28 which engages with the outer casing member 2. The sealing member 28 so provides a sealing contact between the inner casing member 3 and the outer casing member 2.

Further, the two way restrictor 7 is mounted in the bearing 12, which is in sliding contact with the upper section 16 of the inner casing member 3.

In this way the oil reservoir 4 is divided into three distinct sections 4a, 4b and 4c.

In a fully extended position (as shown in FIG. 1) i.e. under no compression the volume of oil in the section 4c of the reservoir 4 is substantially zero. As the shock absorber 1 is compressed the volume of oil in the section 4c of the reservoir 4 increases, whilst the volume of oil in section 4b diminishes, and the inner casing member 3 moves in the direction indicated by the arrow A.

In order to prevent over extension of the shock absorber 1 a stop member 29 is provided on the lower section 17 of the inner casing member 3. This stop member 29 engages with the lip 13 of the outer casing member 2 to prevent over extension.

The slidable piston 8 is mounted in the inner casing member 3, so that it may travel between the inwardly turned lip 20 and the abutment member 21.

Two sealing members 24, 25 are provided on the slidable piston 8, so as to prevent the ingress of oil past the piston.

The upper end of the outer casing member 2, in the vicinity of the inflation valve 11, and above the hydraulic oil in the reservoir, is provided with a gaseous volume 26 of nitrogen.

The volume 27 defined by the inner casing member 3, and below the slidable piston 8 is also filled with nitrogen.

In operation under compressive forces the inner casing member 3 moves in a direction A, and the hydraulic oil flows from the reservoir section 4b through the two way restrictor 7 into section 4a of the reservoir and from section 4b of the oil reservoir through the one-way restrictor 5 into section 4c of the oil reservoir. The flow of oil from section 4b of the reservoir to section 4a of the reservoir provides the shock absorber with damping upon closure thereof.

The flow of oil through the one-way restrictor 5 forces the plate valve 6 out of contact with the restrictor 5, and against the stop member 29.

In this way oil flows freely through the one-way restrictor 5, and substantially no restriction occurs. Further, as the pressure in the section 4b increases oil is prevented from flowing into section 4c of the reservoir in the area between the inner casing member 3 and the outer casing member 2 by the action of sealing member 28. The converse, for the flow of oil, is true when the compressive force is released, i.e. no oil flows from section 4c to 4b of the reservoir via this route.

The difference in diameters of the inner casing member 3 between the two sections of the oil reservoir prevents cavitation occurring under compression of the shock absorber 1. Hence there is no gas build-up in the restrictors, or section 4c of the reservoir.

Further, the volumes 26, 27 of nitrogen with the action of the slidable piston 8 provide the shock absorber with a two stage gas spring effect under compression.

Now, when the compressive force is released, or relaxed oil will flow from section 4c and 4a of the oil reservoir to section 4b thereof. The flow of oil through the one-way restrictor 5 causes plate valve 6 to be forced into contact with the restrictor. Hence, when oil is flowing in this direction a restriction is applied, so providing recoil dampening.

In all other aspects of operation the shock absorber is essentially identical to those already know in the industry.

I claim:

1. A hydraulic shock absorber including:
    a first casing member telescopically and sealingly engaged with a second casing member, said second casing member having a first section of reduced diameter in comparison to a second section;
    oil reservoir means defined by the first and second casing members, which is divided into two distinct volumes by a one-way restrictor means attached to the second casing member;
    a slidable piston mounted within the second casing member, so as to separate the oil reservoir means from a gaseous capacity; wherein the one-way restrictor means acts to restrict the flow of oil from the volume of the oil reservoir means defined by the first casing member and the second section of the second casing member to the volume of the reservoir means defined by the first casing member and the first section of the second casing member only and the volume of the oil reservoir means defined by the first casing member and the first section of the second casing member is further divided into two sections by a restrictor means.

2. A hydraulic shock absorber as claimed in claim 1, wherein the hydraulic shock absorber is provided with a gaseous volume in the volume of the oil reservoir which is defined by the first casing member and the first section of the second casing member.

3. A hydraulic shock absorber as claimed in claim 1, wherein the gaseous capacity consists of a volume of substantially inert gas.

4. A hydraulic shock absorber as claimed in claim 1, wherein the last-named restrictor means is a two-way restrictor means.

5. A hydraulic shock absorber as claimed in claim 4, wherein the hydraulic shock absorber is provided with a gaseous volume in the volume of the oil reservoir which is defined by the first casing member and the first section of the second casing member.

6. A hydraulic shock absorber as claimed in claim 5, wherein the gaseous capacity consists of a volume of substantially inert gas.

* * * * *